(12) United States Patent
Shin et al.

(10) Patent No.: US 7,858,669 B2
(45) Date of Patent: *Dec. 28, 2010

(54) COMPOSITION FOR ALIGNMENT FILM HAVING EXCELLENT ADHESIVENESS

(75) Inventors: Du-Hyun Shin, Daejeon (KR); Hyuk Yoon, Gyunggi-do (KR); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/226,864

(22) PCT Filed: Nov. 15, 2007

(86) PCT No.: PCT/KR2007/005736

§ 371 (c)(1),
(2), (4) Date: Oct. 30, 2008

(87) PCT Pub. No.: WO2008/060109

PCT Pub. Date: May 22, 2008

(65) Prior Publication Data

US 2009/0312453 A1  Dec. 17, 2009

(30) Foreign Application Priority Data

Nov. 16, 2006 (KR) .................. 10-2006-0113252

(51) Int. Cl.
*C09K 19/04* (2006.01)
*C08F 2/46* (2006.01)

(52) U.S. Cl. ............... 522/8; 522/42; 522/79; 522/84; 522/85; 522/121; 428/1.5

(58) Field of Classification Search ............... 522/109, 522/121, 85, 36, 42, 84, 79, 8; 428/1.5
See application file for complete search history.

(56) References Cited

U.S. PATENT DOCUMENTS

| 5,276,089 | A * | 1/1994 | Colby et al. ............ 525/67 |
| 6,660,182 | B2 * | 12/2003 | Jester .................. 252/299.01 |
| 2009/0117293 | A1 * | 5/2009 | Shin et al. ............... 428/1.2 |

FOREIGN PATENT DOCUMENTS

| JP | 9026667 | 1/1997 |
| JP | 2004361600 | 12/2004 |
| JP | 2006297600 | 11/2006 |
| JP | 2006308725 | 11/2006 |

* cited by examiner

*Primary Examiner*—Susan W Berman
(74) *Attorney, Agent, or Firm*—McKenna Long & Aldridge LLP

(57) ABSTRACT

There is provided a novel composition for an alignment film having excellent adhesiveness to a liquid crystal layer as well as to a substrate when a cycloolefin-based aligned film (COP) is used as the substrate instead of triacetyl cellulose (TAC) that is used as a conventional substrate for an optical film whose optical properties are significantly deteriorated when it is used under hot and humid environments. The composition for an alignment film that is used for splay alignment includes polyvinyl alcohol (PVA); 13 to 25% by weight of an aery late monomer based on the weight of the polyvinyl alcohol; 20 to 30 % by weight of a compatibilizing agent based on the weight of the acrylate monomer; and 10 to 50% by weight of an aqueous photo initiator based on the weight of the acrylate monomer.

28 Claims, 5 Drawing Sheets

(a)

(b)

[Fig. 1]
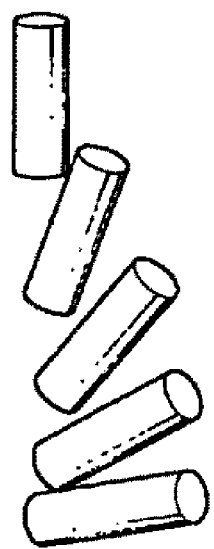

[Fig. 2]
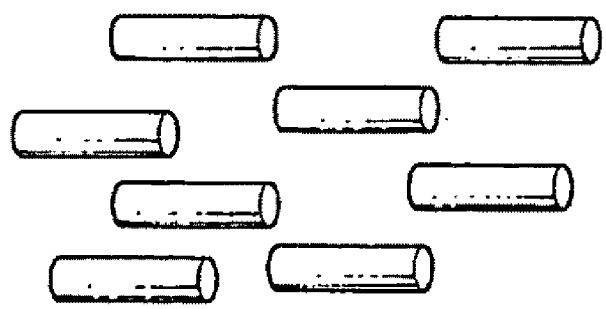

[Fig. 3]
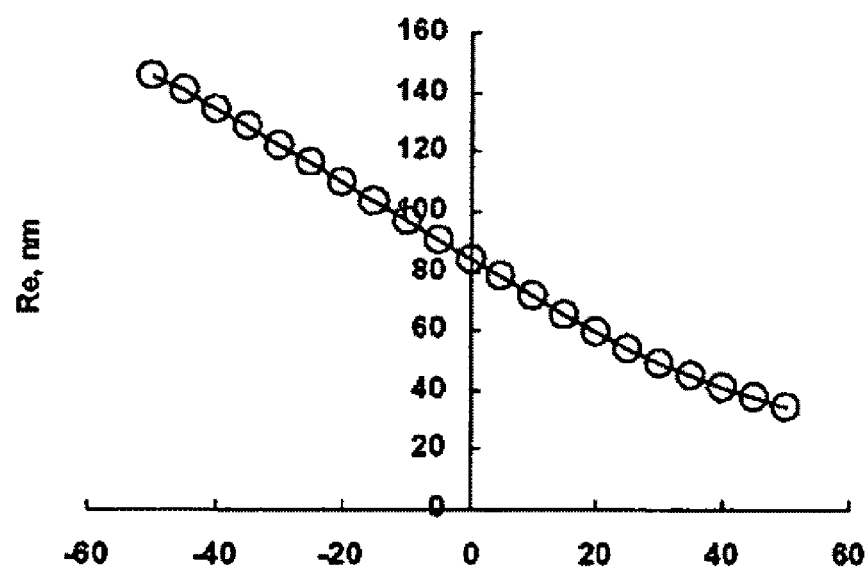

[Fig. 4]
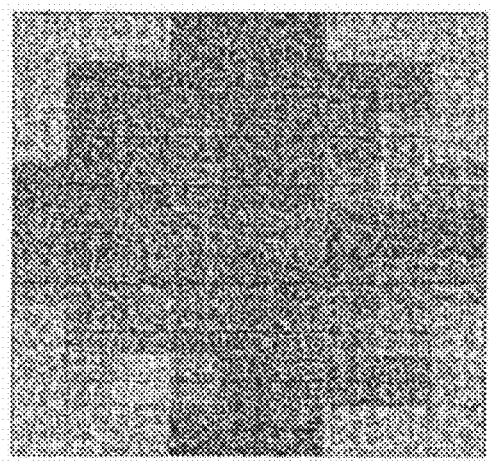 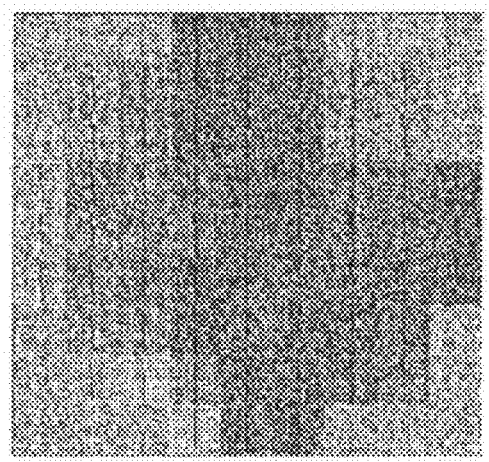
(a) (b)

[Fig. 5]
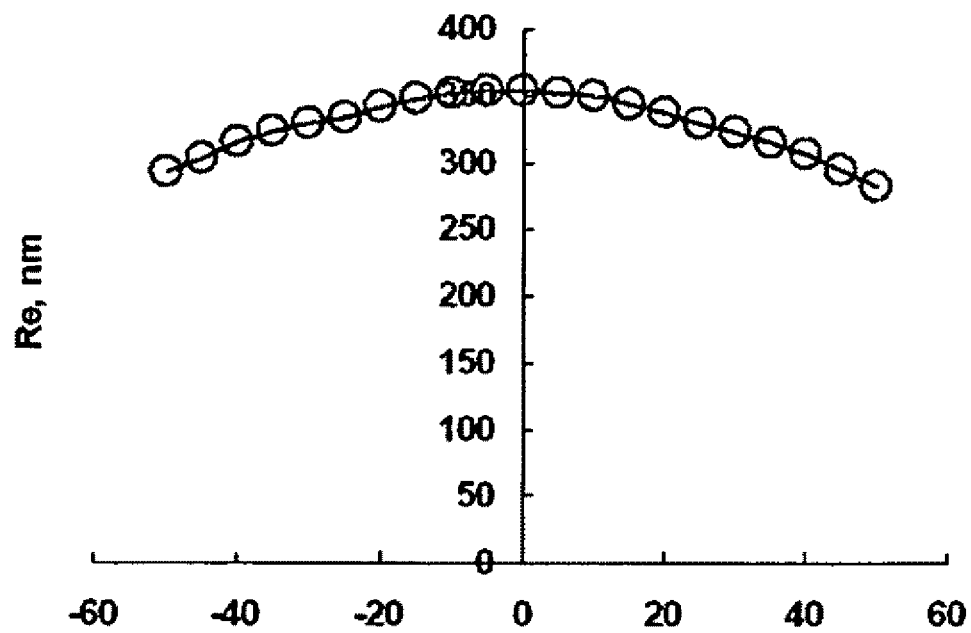

COMPOSITION FOR ALIGNMENT FILM HAVING EXCELLENT ADHESIVENESS

This application claims the benefit of PCT/KR2007/005736 filed on Nov. 15, 2007 and also Korean Patent Application No. 10-2006-0113252 filed on Nov. 16, 2006, the contents of which is hereby incorporated herein by reference in their entirety.

TECHNICAL FIELD

The present invention relates to a composition for an alignment film having excellent adhesiveness, and more particularly, to a novel composition for an alignment film having excellent adhesiveness to a liquid crystal layer as well as to a substrate when a cycloolefin-based aligned film (COP) is used as the substrate instead of triacetyl cellulose (TAC) that has been used as a conventional substrate for an optical film whose optical properties are significantly deteriorated when it is used under hot and humid environments.

BACKGROUND ART

A liquid crystal display device (LCD) is a display device that expresses pixels on the principle of selectively penetrating light depending on the changes in polarization effects according to the array of liquid crystal disposed between polarizing plates.

IF the display device consists of the liquid crystal and polarizing plate comprising only polarizer, brightness or contrast is seriously deteriorated, or light leakage is caused when a liquid crystal is viewed at various viewing angles except when the liquid crystal is viewed vertically from the front side of a liquid crystal screen. Therefore, the polarizing plate includes an optical compensation film, such as a retardation film or a viewing angle compensation film, in addition to the polarizer, or these films are generally adhered to a panel through a separate process.

The optical compensation film is mainly divided into two films: one stretched film prepared by stretching a polymer film to give optical anisotropy, and the other liquid crystal film prepared by coating a plastic substrate with a polymeric liquid crystal compound and curing the polymeric liquid crystal compound. In particular, the stretched film does not have anisotropy such as optically uniaxial or biaxial anisotropy, but the liquid crystal film may have various optical properties that the aligned film may not have. Liquid crystal may be mainly divided into a disc-type liquid crystal and a rod-type liquid crystal, depending on the shape of the liquid crystal molecules. Among them, the rod-type liquid crystal can be aligned in various shapes such as planar, homeotropic, tilted, splay, cholesteric shapes, and therefore their optical properties owing to the various shapes are also diverse and unique, compared to those of the aligned film. Also, the liquid crystal film may function as a protective film and an optical compensation film of the polarizer by forming the liquid crystal film on the stretched film. Accordingly, the liquid crystal film has been increasingly demanded.

The liquid crystal film is generally manufactured by coating a plastic substrate with a composition for an alignment film that is used to form a liquid crystal alignment film, drying and curing the composition to form an alignment film, after then rubbing the alignment film to give an alignment property, and coating the alignment film with a liquid crystal, following by repeating the drying and curing process. If the alignment film does not have excellent adhesiveness to the liquid crystal film or the substrate, the liquid crystal film is peeled off from the alignment film, or the liquid crystal film may be shrunken under hot and humid environments. Accordingly, the liquid crystal film with excellent adhesiveness is required.

Polyimide, as a material for an alignment film that is used to form the alignment film, was widely known in the art, but polyvinyl alcohol has been recently used. However, when the polyvinyl alcohol is used in the composition for an alignment film, a liquid crystal film may be peeled off from the alignment film due to the insufficient adhesive force to the liquid crystal film, or the liquid crystal film may be shrunken under hot and humid environments, as described above.

Also, Japanese Patent Laid-open Publication Nos. 2002-62426 and Hei 7-179125 disclose a method using a modified polyvinyl alcohol in which polyvinyl alcohol is modified to improve an adhesive force to a liquid crystal film, but it is difficult to directly use the modified polyvinyl alcohol as a coating solution, and therefore the modified polyvinyl alcohol is subject to additional separation and purification process, and then may be used as a composition for an alignment film.

Also, the alignment film is generally formed on a substrate. Since even the composition for an alignment film prepared thus may be restrictively used according to the kind of available substrates, the alignment film may be effectively adhered to the substrate such as triacetyl cellulose (TAC), but adhesiveness to the substrate such as cycloolefin polymer (COP) is poor.

That is, a triacetyl cellulose substrate is widely used to form an alignment film, but has problems that light leakage appears in the substrate under hot and humid environments due to its high hygroscopicity, and its degree of polarization is deteriorated. Therefore, there have been proposed a variety of substrates that may be substituted for the triacetyl cellulose substrate, and a cycloolefin polymer is one representative substrate among them.

However, the cycloolefin polymer has poor adhesiveness when the conventional composition for an alignment film is used for cycloolefin polymer as described above, and therefore an alignment film may be detached from the cycloolefin polymer.

In addition to the context as described above, the alignment film should also have a basic ability to uniformly align liquid crystal molecules in a rubbing direction when a surface of the alignment film is rubbed, and this ability of the alignment film may be represented by an optical-axis departure angle showing a degree where the liquid crystal molecules depart from the rubbing direction. However, the convention alignment film, namely an alignment film using polyvinyl alcohol, has a alignment to prevent some degree of optical-axis departure, but the degree of optical-axis departure of the alignment film is not sufficient. If a liquid crystal has a high optical-axis departure angle, a polarizing plate made of the liquid crystal has a problem that light leakage may be included and optical loss such as poor contrast ratio may be caused in the polarizing plate.

DISCLOSURE OF INVENTION

Technical Problem

An aspect of the present invention provides a composition for an alignment film capable of being manufactured without any of separate separation and purification processes and having excellent adhesiveness to a liquid crystal layer formed on an alignment film.

Also, another aspect of the present invention provides a composition for an alignment film having good adhesiveness to a substrate even when the alignment film is formed on the substrate other than triacetyl cellulose such as cycloolefin polymer.

Also, still another aspect of the present invention provides a composition for an alignment film capable of minimizing an optical-axis departure of a liquid crystal when a liquid crystal film is formed on the alignment film.

Technical Solution

According to an aspect of the present invention, there is provided a composition for an alignment film that is used for splay alignment, including polyvinyl alcohol (PVA); 13 to 25% by weight of an acrylate monomer based on the weight of the polyvinyl alcohol; 20 to 30% by weight of a compatibilizing agent based on the weight of the acrylate monomer; and 10 to 50% by weight of an aqueous photo initiator based on the weight of the acrylate monomer.

In this case, the polyvinyl alcohol may be hydrolyzed by 96% or less.

In addition, one or two or more multifunctional acrylate monomers having 3 to 6 carbon atoms may be used as the acrylate monomer.

In this case, the acrylate monomer may be desirably pentaerythritol triacrylate (PETA), pentaerythritol tetraacrylate (PETTA) or dipentaerythritol hexaacrylate (DPHA).

Also, the acrylate monomer may be present at a content of 17 to 25% by weight based on the weight of the polyvinyl alcohol when the acrylate monomer is pentaerythritol triacrylate.

In addition, the acrylate monomer may be present at a content of 15 to 21% by weight based on the weight of the polyvinyl alcohol when the acrylate monomer is pentaerythritol tetraacrylate.

Furthermore, the acrylate monomer may be present at a content of 13 to 21% by weight based on the weight of the polyvinyl alcohol when the acrylate monomer is dipentaerythritol hexaacrylate.

And, the compatibilizing agent may be soluble in water.

In this case, the compatibilizing agent may desirably include poly(4-vinylphenol).

And, the photo initiator may be desirably soluble in water.

In addition, the photo initiator may be selected from the group consisting of IRGACURE 2959 (2-hydroxy-1-[4-(2-hydroxyethoxy)phenyl]-2-methyl-1-propanone), IRGACURE 500 (1-hydroxy-cyclohexyl-phenyl-ketone+benzophenone) and IRGACURE 754 (oxy-phenyl-acetic acid 2-[2-oxo-2-phenyl-acetoxy-ethoxy]-ethyl ester and oxy-phenyl-acetic 2-[2-hydroxy-ethoxy]-ethyl ester).

Also, the composition for an alignment film may be dissolved in a mixture solvent of water and alcohol to form a composition solution for an alignment film.

Furthermore, the composition for an alignment film may be desirably present at a content of 2.44 to 7.25% by weight in the composition solution.

In this case, a ratio of water:alcohol in the mixture solvent may range from 40:60 to 50:50.

Also, the alcohol may be methyl alcohol, ethyl alcohol, or isopropyl alcohol.

According to another aspect of the present invention, there is provided a composition for an alignment film that is used for planar alignment, including polyvinyl alcohol (PVA); more than 25% by weight of an acrylate monomer based on the weight of the polyvinyl alcohol; 20 to 30% by weight of an aqueous compatibilizing agent based on the weight of the acrylate monomer; and 10 to 50% by weight of an aqueous photo initiator based on the weight of the acrylate monomer.

In this case, the polyvinyl alcohol may be hydrolyzed by 96% or less.

In addition, one or two or more multifunctional acrylate monomers having 3 to 6 carbon atoms may be used as the acrylate monomer.

In this case, the acrylate monomer may be desirably pentaerythritol triacrylate (PETA), pentaerythritol tetraacrylate (PETTA) or dipentaerythritol hexaacrylate (DPHA).

And, the acrylate monomer may be present at a content of more than 30% by weight based on the weight of the polyvinyl alcohol when the acrylate monomer is pentaerythritol triacrylate.

Also, the acrylate monomer may be present at a content of more than 25% by weight based on the weight of the polyvinyl alcohol when the acrylate monomer is pentaerythritol tetraacrylate.

Also, the acrylate monomer may be present at a content of more than 25% by weight based on the weight of the polyvinyl alcohol when the acrylate monomer is dipentaerythritol hexaacrylate.

In addition, the compatibilizing agent may be soluble in water.

In this case, the compatibilizing agent may be desirably poly(4-vinylphenol).

Furthermore, the photo initiator may be soluble in water.

Also, the photo initiator may be selected from the group consisting of IRGACURE 2959 (2-hydroxy-1-[4-(2-hydroxyethoxy)phenyl]-2-methyl-1-propanone), IRGACURE 500 (1-hydroxy-cyclohexyl-phenyl-ketone+benzophenone) and IRGACURE 754 (oxy-phenyl-acetic acid 2-[2-oxo-2-phenyl-acetoxy-ethoxy]-ethyl ester and oxy-phenyl-acetic 2-[2-hydroxy-ethoxy]-ethyl ester).

Also, the composition for an alignment film may be dissolved in a mixture solvent of water and alcohol to form a composition solution for an alignment film.

In this case, the composition for an alignment film may be present at a content of 3.78 to 8.15% by weight in the composition solution.

In this case, a ratio of water:alcohol in the mixture solvent may range from 40:60 to 50:50.

Also, the alcohol may be methyl alcohol, ethyl alcohol, or isopropyl alcohol.

ADVANTAGEOUS EFFECTS

According to the present invention, the additional separation and purification processes are not required, and it is possible to prepare the composition for an alignment film having excellent adhesiveness to the liquid crystal layer formed on the alignment film, and the alignment film has good adhesiveness even when it is formed on certain substrates rather than triacetyl cellulose such as a cycloolefin polymer, and the liquid crystal film formed on the alignment film has a minimized optical-axis departure angle.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a schematic view illustrating a splay alignment configuration,

FIG. 2 is a schematic view illustrating a planar alignment configuration,

FIG. 3 is a graph illustrating a phase-difference distribution according to the viewing angles of a splay-aligned liquid crystal film formed on an alignment film prepared in Example 1 of the present invention, FIG. 4 is a diagram illustrating the results obtained by comparing degrees of optical-axis departure of an alignment film prepared in Example 1 of the present invention and a liquid crystal film formed on a conventional alignment film, and FIG. 5 is a graph illustrating a phase-difference distribution according to the viewing angles of a planar-aligned liquid crystal film formed on an alignment film prepared in Example 4 of the present invention.

BEST MODE FOR CARRYING OUT THE INVENTION

Exemplary embodiments of the present invention will now be described in detail with reference to the accompanying drawings.

In order to solve the above problems in the art, the present inventors have ardently attempted to develop a novel composition for an alignment film that meets the objects of the present invention, and found that it is possible to prepare a composition for an alignment film having excellent physical properties when the composition for an alignment film includes polyvinyl alcohol, and a multifunctional acrylate monomer, a compatibilizing agent, a photo initiator and a solvent, and therefore the present invention is completed on the basis of the above facts.

First, the term "composition for an alignment film", used in the present invention, is referred to as a material mixture for forming an alignment film, the material mixture being able to be manufactured into an alignment film having excellent physical properties which are required for the present invention when the material mixture is polymerized. The composition for an alignment film provided in the present invention should have different components and their contents, depending on whether a liquid crystal is splay-aligned as shown in FIG. 1, or planar-aligned as shown in FIG. 2, and this context is described in detail, as follows.

First, adhesive properties between a liquid crystal and an alignment film, and conditions where the liquid crystal can be splay-aligned should be all satisfied to splay-align the liquid crystal as shown in FIG. 1. Of course, it does not depend completely on the composition for an alignment film whether to splay-align or planar-align a liquid crystal. Patterns of the alignment depend highly on the methods for forming a liquid crystal on an alignment film, as well as the characteristics of the composition for an alignment film. Therefore, it is not necessarily a case that only the splay alignment appear within the content ranges of this composition for an alignment film, whereas only the planar alignment appear within the content ranges of the composition for an alignment film that is used for planar alignment. Accordingly, the content ranges of the composition for an alignment film used for splay alignment does not necessarily exclude the content ranged of the composition for an alignment film used for planar alignment, and therefore it is considered that the content ranges of the two above-mentioned compositions may be partially overlapped with each other.

The composition for an alignment film used for splay alignment according to the present invention includes polyvinyl alcohol (PVA), 13 to 25% by weight of an acrylate monomer based on the weight of the polyvinyl alcohol; 20 to 30% by weight of a compatibilizing agent based on the weight of the acrylate monomer; and 10 to 50% by weight of an aqueous photo initiator based on the weight of the acrylate monomer. The composition for an alignment film according to the present invention is preferably dissolved in a mixture solvent of water and alcohol so that it can be present at a content of 2.44 to 7.25% by weight in the entire content of the composition solution.

Among the components of the composition for an alignment film, the polyvinyl alcohol is a main compound that forms an alignment film, and all contents of the other components are used on the basis of the weight of the polyvinyl alcohol. The polyvinyl alcohol has a weight average molecular weight (Mw) of 85,000 to 146,000, and is preferably hydrolyzed by 96% or less. However, the weight average molecular weight of the polyvinyl alcohol slightly affects adhesive property, but does not have wide difference in performance of the alignment film. Generally, polyvinyl alcohol having a weight average molecular weight of 85,000 to 146,000 is widely used. Furthermore, the polyvinyl alcohol that is hydrolyzed by 80% or more in general is widely used, but the polyvinyl alcohol that is hydrolyzed by greater than 96% is not desirable since it adversely affect adhesive property and alignment characteristic of the alignment film, and therefore it is preferred to use the polyvinyl alcohol that is hydrolyzed by 96% or less. Also, there is no need to particularly define the lowest degree of hydrolysis, but a minimum degree of hydrolysis of the polyvinyl alcohol which is obtainable is about 80% in general.

Similarly, the acrylate monomer is also an important compound that assists the polyvinyl alcohol through the cross-linking reaction to form an alignment film having advantageous effects of the present invention, and, thus, the acrylate monomer is preferably present in a content of 13 to 25% by weight, based on the weight of the polyvinyl alcohol. When the acrylate monomer is present in a content of less than 13% by weight based on the weight of the polyvinyl alcohol, interlayer adhesion between the alignment film and the liquid crystal film, or between the alignment film and the substrate such as cycloolefin polymer (COP) is poor, and therefore the alignment film or the liquid crystal film may be peeled off. On the contrary, when the acrylate monomer is present at a content of greater than 25% by weight based on the weight of the polyvinyl alcohol, it is difficult to splay-align a liquid crystal. The acryl monomer more preferably includes multifunctional acrylates, and, among them, particularly preferably includes $C_3$-$C_6$ acrylates, that are triacrylate (in particular, pentaerythritol triacrylate, PETA), tetraacrylate (in particular, pentaerythritol tetraacrylate, PETTA), hexaacrylate (in particular, dipentaerthritol hexaacrylate, DPHA), etc. They may be used alone or in combinations thereof. When triacrylate is used as the monomer, a suitable content range of the triacrylate ranges from 17 to 25% by weight based on the weight of the polyvinyl alcohol, and when tetraacrylate is used as the monomer, the tetraacrylate is preferably present at a content of 15 to 21% by weight based on the weight of the polyvinyl alcohol. Also, when hexaacrylate is used as the monomer, the hexaacrylate is preferably used at a content of 13 to 21% by weight based on the weight of the polyvinyl alcohol. The upper and lower limits of the components are defined to secure an interlayer adhesive force and easily achieve the splay alignment at the same time. The triacrylate is the most preferably present at a content of 20% by weight, the tetraacrylate is the most preferably present at a content of 18% by weight, and the hexaacrylate is the most preferably present at a content of 17% by weight, based on the weight of the polyvinyl alcohol.

Also, a compatibilizing agent is preferably used as an adhesion promoter to improve adhesiveness. The compatibilizing agent is preferably present at a content of 20 to 30% by weight, based on the weight of the acrylate monomer. When the compatibilizing agent is present at a content of less than 20% by weight, the composition for an alignment film is not uniformly dispersed on a substrate to wet a surface of the substrate if the substrate is coated with the composition for an alignment film according to the present invention in the form of solution, which leads to a dewetting phenomenon where solution drops lumps together. Accordingly, it is difficult to form an alignment film on the substrate. On the contrary, when the content of the compatibilizing agent exceeds 30% by weight based on the weight of the acrylate monomer, it is difficult to splay-align a liquid crystal film. The most preferable content of the compatibilizing agent is 25% by weight, based on the weight of the acrylate monomer. The compatibilizing agent is preferably soluble in water considering that the composition for an alignment film is preferably dissolved in a mixture solvent of water and alcohol, and used. Representative examples of the above-mentioned aqueous compatibilizing agent may include poly(4-vinylphenol), and more particularly poly(4-vinylphenol) with a weight average molecular weight of 8,000 or 20,000.

In order to form the composition for an alignment film coated onto the substrate into an alignment film, it is necessary to cure the composition for an alignment film. The curing of the composition for an alignment film may be commonly carried out by drying the composition for an alignment film to evaporate a solvent and optically curing (particularly, UV-curing) the solvent-free alignment film. For this purpose, the composition for an alignment film necessarily includes a photo initiator. The photo initiator is preferably present at a content of 10 to 50% by weight, based on the weight of the acrylate monomer. When the photo initiator is present at a content of less than 10% by weight based on the weight of the acrylate monomer, a photopolymerization reaction is not easily carried out, and therefore it is difficult to cure the alignment film, whereas it is difficult to align a liquid crystal when the content of the photo initiator exceeds 50% by weight based on the weight of the acrylate monomer. The most preferable content of the photo initiator is 25% by weight, based on the weight of the acrylate monomer. Also, the photo initiator is preferably soluble in water considering that the photo initiator are used in a mixture solvent of water and alcohol, and examples of the photo initiator includes IRGACURE 2959 (2-hydroxy-1-[4-(2-hydroxyethoxy)phenyl]-2-methyl-1-propanone), IRGACURE 500 (1-hydroxy-cyclohexyl-phenyl-ketone+benzophenone), IRGACURE 754 (oxy-phenyl-acetic acid 2-[2-oxo-2-phenyl-acetoxy-ethoxy]-ethyl ester and oxy-phenyl-acetic 2-[2-hydroxy-ethoxy]-ethyl ester), all of which are commercially available from Ciba-Geigy.

The composition for an alignment film according to the present invention having the above-mentioned components is preferably dissolved in a mixture solvent of water and alcohol, and used. Here, it is preferred to use methyl alcohol, ethyl alcohol, isopropyl alcohol and the like as the alcohol. Here, a ratio of water:alcohol in the solvent preferably ranges from 40:60 to 50:50 when the mixture solvent is prepared, and the most preferable ratio of the water:alcohol is 41:59 when methyl alcohol or ethyl alcohol is used as the alcohol, and 40:60 when isopropyl alcohol is used as the alcohol. The composition for an alignment film is preferably present at a content of 2.44 to 7.25% by weight based on the total weight of the composition (in the form of solution). In this case, when the composition for an alignment film is present at a content of less than 2.44% by weight, it is difficult to form an alignment film of sufficient thickness due to the presence of the excessive solvent, and it is impossible to secure adhesiveness.

On the contrary, when the composition for an alignment film is present at a content of greater than 7.25% by weight, it is difficult to splay-align a liquid crystal. Accordingly, a suitable content of the composition for an alignment film except for the solvent ranges from 2.44 to 7.25% by weight.

The above-mentioned composition for an alignment film may be prepared according to the currently known conventional methods for preparing a composition. However, as a more effective method for preparing the composition for an alignment film, there is a preferred method including: preparing a solution where polyvinyl alcohol is dissolved in water at 150° C., and a solution where acrylate, a compatibilizing agent and a photo initiator are dissolved in ethanol, mixing the two solutions and re-heating the resultant mixture at 150° C. All components constituting the composition for an alignment film may be mixed together at once, but the ethanol is not mixed well with the polyvinyl alcohol when all the components are mixed together at once, and therefore the two-step mixing method is preferable due to the long manufacturing time of the one-step mixing method.

Next, a composition for an alignment film used for planar alignment, as shown in FIG. 2, will be described in detail.

The composition for an alignment film used for planar alignment according to the present invention includes polyvinyl alcohol (PVA); more than 25% by weight of an acrylate monomer based on the weight of the polyvinyl alcohol; 20 to 30% by weight of an aqueous compatibilizing agent based on the weight of the acrylate monomer; and 10 to 50% by weight of an aqueous photo initiator based on the weight of the acrylate monomer. The composition for an alignment film according to the present invention is preferably dissolved in a mixture solvent of water and alcohol to so that it can be present in a content of 3.78 to 8.15% by weight in the total content of the composition solution.

Among the components of the composition for an alignment film, the polyvinyl alcohol is a main compound that forms an alignment film, and all contents of the other components are used on the basis of the weight of the polyvinyl alcohol. The polyvinyl alcohol has a weight average molecular weight (Mw) of 85,000 to 146,000, and is preferably hydrolyzed by 96% or less. However, the weight average molecular weight of the polyvinyl alcohol slightly affects adhesive property, but does not have wide difference in performance of the alignment film. Generally, polyvinyl alcohol having a weight average molecular weight of 85,000 to 146,000 is widely used. Furthermore, the polyvinyl alcohol that is hydrolyzed by 80% or more in general is widely used, but the polyvinyl alcohol that is hydrolyzed by greater than 96% is not desirable since it adversely affect adhesive property and alignment characteristic of the alignment film, and therefore it is preferred to use the polyvinyl alcohol that is hydrolyzed by 96% or less. Also, there is no need to particularly define the lowest degree of hydrolysis, but a minimum degree of hydrolysis of the polyvinyl alcohol which is obtainable is about 80% in general.

Similarly, the acrylate monomer is also an important compound that assists the polyvinyl alcohol through the crosslinking reaction to form an alignment film having advantageous effects of the present invention, and, thus, the acrylate monomer is preferably present in a content of more than 25% by weight, based on the weight of the polyvinyl alcohol. When the acrylate monomer is present in a content of less than 25% by weight based on the weight of the polyvinyl alcohol, interlayer adhesion between the alignment film and the liquid crystal film, or between the alignment film and the substrate such as cycloolefin polymer (COP) is poor, and therefore the alignment film or the liquid crystal film may be peeled off. On the contrary, according to the results examined by the present inventors, there is no particular problem regarding the high weight ratio of the polyvinyl alcohol in the acrylate monomer. The results examined by the present inventors show that there is no particular problem when the acrylate monomer is added up to 200%, based on the weight of the polyvinyl alcohol. However, the uppermost content of the acrylate is more preferably defined to 200% based on the weight of the polyvinyl alcohol since the addition of more than 200% by weight of the acrylate monomer may lead to the relatively low content of the polyvinyl alcohol. The acryl monomer more preferably includes multifunctional acrylates, and, among them, particularly preferably includes $C_3$-$C_6$ acrylates, that are triacrylate (in particular, pentaerythritol triacrylate, PETA), tetraacrylate (in particular, pentaerythritol tetraacrylate, PETTA), hexaacrylate (in particular, dipentaerthritol hexaacrylate, DPHA), etc. They may be used alone or in combinations thereof. When triacrylate is used as the monomer, a suitable content range of the triacrylate is preferably present at a content of more than 30% by weight based on the weight of the polyvinyl alcohol, and when tetraacrylate is used as the monomer, the tetraacrylate is preferably present at a content of more than 25% by weight based on the weight of the polyvinyl alcohol. Also, when hexaacrylate is used as the monomer, the hexaacrylate is preferably used at a content of more than 25% by weight based on the weight of the polyvinyl alcohol. The upper and lower limits of the components are defined to secure an interlayer adhesive force and easily achieve the planar alignment at the same time. The triacrylate is the most preferably present at a content of 35% by weight, the tetraacrylate is the most preferably present at a content of 30% by weight, and the hexaacrylate is the most preferably present at a content of 30% by weight, based on the weight of the polyvinyl alcohol.

Also, a compatibilizing agent is preferably used as an adhesion promoter to improve adhesiveness. The compatibilizing agent is preferably present at a content of 20 to 30% by weight, based on the weight of the acrylate monomer. When the compatibilizing agent is present at a content of less than 20% by weight, the composition for an alignment film is not uniformly dispersed on a substrate to wet a surface of the substrate if the substrate is coated with the composition for an alignment film according to the present invention in the form of solution, which leads to a dewetting phenomenon where solution drops lumps together. Accordingly, it is difficult to form an alignment film on the substrate. On the contrary, when the content of the compatibilizing agent exceeds 30% by weight based on the weight of the acrylate monomer, it is difficult to planar-align a liquid crystal film. The most preferable content of the compatibilizing agent is 25% by weight, based on the weight of the acrylate monomer. The compatibilizing agent is preferably soluble in water, considering that the composition for an alignment film is preferably dissolved in a mixture solvent of water and alcohol, and used. Representative examples of the above-mentioned aqueous compatibilizing agent include poly(4-vinylphenol), and more particularly poly(4-vinylphenol) with a weight average molecular weight of 8,000 or 20,000.

In order to form the composition for an alignment film coated onto the substrate into an alignment film, it is necessary to cure the composition for an alignment film. The curing of the composition for an alignment film may be commonly carried out by drying the composition for an alignment film to evaporate a solvent and optically curing (particularly, UV-curing) the solvent-free alignment film. For this purpose, the composition for an alignment film necessarily includes a photo initiator. The photo initiator is preferably present at a content of 10 to 50% by weight, based on the weight of the acrylate monomer. When the photo initiator is present at a content of less than 10% by weight based on the weight of the acrylate monomer, a photopolymerization reaction is not easily carried out, and therefore it is difficult to cure the alignment film, whereas it is difficult to align a liquid crystal when the content of the photo initiator exceeds 50% by weight based on the weight of the acrylate monomer. The most preferable content of the photo initiator is 25% by weight, based on the weight of the acrylate monomer. Also, the photo initiator is preferably soluble in water considering that the photo initiator are used in a mixture solvent of water and alcohol, and examples of the photo initiator includes IRGACURE 2959 (2-hydroxy-1-[4-(2-hydroxyethoxy)phenyl]-2-methyl-1-propanone), IRGACURE 500 (1-hydroxy-cyclohexyl-phenyl-ketone+benzophenone), IRGACURE 754 (oxy-phenyl-acetic acid 2-[2-oxo-2-phenyl-acetoxy-ethoxy]-ethyl ester and oxy-phenyl-acetic 2-[2-hydroxy-ethoxy]-ethyl ester), all of which are commercially available from Ciba-Geigy.

The composition for an alignment film according to the present invention having the above-mentioned components is preferably dissolved in a mixture solvent of water and alcohol, and used. Here, it is preferred to use methyl alcohol, ethyl alcohol, isopropyl alcohol and the like as the alcohol. Here, a ratio of water:alcohol in the solvent preferably ranges from 40:60 to 50:50 when the mixture solvent is prepared, and the most preferable ratio of the water:alcohol is 41:59 when methyl alcohol or ethyl alcohol is used as the alcohol, and 40:60 when isopropyl alcohol is used as the alcohol. The composition for an alignment film is preferably present at a content of 3.78 to 8.15% by weight based on the total weight of the composition (in the form of solution). In this case, when the composition for an alignment film is present at a content of less than 3.78% by weight, it is difficult to form an alignment film of sufficient thickness due to the presence of the excessive solvent, and it is impossible to secure adhesiveness. On the contrary, when the composition for an alignment film is present at a content of greater than 8.78% by weight, it is difficult to planar-align a liquid crystal. Accordingly, a suitable content of the composition for an alignment film except for the solvent ranges from 3.78 to 8.15% by weight.

The above-mentioned composition for an alignment film may be prepared according to the currently known conventional methods for preparing a composition. However, as a more effective method for preparing the composition for an alignment film, there is a preferred method including: preparing a solution where polyvinyl alcohol is dissolved in water at 150° C., and a solution where acrylate, a compatibilizing agent and a photo initiator are dissolved in ethanol, mixing the two solutions and re-heating the resultant mixture at 150° C. All components constituting the composition for an alignment film may be mixed together at once, but the ethanol is not mixed well with the polyvinyl alcohol when all the components are mixed together at once, and therefore the two-step mixing method is preferable due to the long manufacturing time of the one-step mixing method.

MODE FOR THE INVENTION

Hereinafter, exemplary embodiments of the present invention will be described in detail with reference to the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

EXAMPLES

Preparation of Alignment Film Used for Splay Alignment

Example 1

A composition solution for an alignment film was prepared by dissolving a controlled content of the composition for an alignment film in a mixture solvent of water and alcohol at a temperature of 150° C., as listed in the following Table 1.

TABLE 1

| | | | weight(g) | weight ratio(%) |
|---|---|---|---|---|
| Composition solution of a for an alignment film | Mixed solvent | Water | 480 | 47.93 |
| | | Ehtanol | 497 | 49.63 |
| | Composition for an alignment film | Polyvinyl alcohol (87% hydrolysis), Mw 85,000~124,000 | 20 | 2.00 |
| | | dipentaerythritol hexaacrylate | 3 | 0.30 |
| | | poly(4-vinylphenol) Mw 8,000 | 0.75 | 0.075 |
| | | IRGACURE 2959 | 0.75 | 0.075 |

A cycloolefin polymer (COP) was coated with the composition solution for an alignment film prepared according to the above method, using a wire bar, and the composition solution for an alignment film was dried with hot wind for 2 minutes in a 100° C. dry oven, and then cured once at a rate of 3 m/min using an 80 W/CM high-pressure mercury vapor lamp, and a surface of the cured alignment film was rubbed to prepare an alignment film.

A polymeric liquid crystal mixture having a splay alignment was dissolved in toluene at a solid concentration of 25% by weight, the polymeric liquid crystal mixture being prepared by mixing 4-(6-acryloyoxyhexyloxy)-benzoic acid (4-cyanophenyl ester), 4-(6-acryloyoxyhexyloxy)-benzoic acid[4-trans-4-propylcyclohexyl]phenyl ester, 4-(3-acryloyoxypropyloxy)-benzoic acid 2-methyl-1,4-phenylene ester, 4-(6-acryloyoxyhexyloxy)-benzoic acid [4-trans-4-propylcyclohexyl]phenyl ester, and 4-(3-acryloyoxypropyloxy)-benzoic acid 2-methyl-1,4-phenylene ester. The alignment film was coated with the resultant liquid crystal solution using a wire bar, dried with hot wind for one minute in a 70° C. dry oven, and then cured once at a rate of 3 m/min, using an 80 W/CM high-pressure mercury vapor lamp, to prepare a liquid crystal film.

As a result, it is possible to finally prepare a film laminate including a COP substrate, a rubbed alignment film formed on the COP substrate, and a liquid crystal film formed on the alignment film, all of which are laminated in sequence.

Adhesive forces between layers, that is, between the COP and the alignment film, and between the alignment film and the liquid crystal film, were evaluated according to the ASTM standard (a cross-cut testing method), and phase difference and optical-axis departure angles were measured according to the viewing angles using an AXOSCAN so as to evaluate optical properties of the liquid crystal film formed on the alignment film.

Example 2

An alignment film is formed on a COP substrate in the same manner as in Example 1 except that a composition solution is prepared with components of the alignment film as listed in the following Table 2, and a film laminate was then prepared in the same manner as used to form a liquid crystal film, including a COP substrate, an alignment film and a liquid crystal film, all of which are laminated in sequence.

TABLE 2

| | | | weight(g) | weight ratio(%) |
|---|---|---|---|---|
| Composition solution of a for an alignment film | Mixed solvent | Water | 480 | 47.90 |
| | | Ehtanol | 496 | 49.50 |
| | Composition for an alignment film | Polyvinyl alcohol (87% hydrolysis), Mw 85,000~124,000 | 20 | 2.00 |
| | | pentaerythritol triacrylate | 4 | 0.40 |
| | | poly(4-vinylphenol) Mw 8,000 | 1 | 0.10 |
| | | IRGACURE 2959 | 1 | 0.10 |

Example 3

An alignment film is formed on a COP substrate in the same manner as in Example 1 except that a composition solution is prepared with components of the alignment film as listed in the following Table 3, and a film laminate was then prepared in the same manner as used to form a liquid crystal film, including a COP substrate, an alignment film and a liquid crystal film, all of which are laminated in sequence.

TABLE 3

| | | | weight(g) | weight ratio(%) |
|---|---|---|---|---|
| Composition solution of a for an alignment film | Mixed solvent | Water | 480 | 47.93 |
| | | Ehtanol | 497 | 49.63 |
| | Composition for an alignment film | Polyvinyl alcohol (87% hydrolysis), Mw 85,000~124,000 | 20 | 2.00 |
| | | pentaerythritol tetraacrylate | 3 | 0.30 |
| | | poly(4-vinylphenol) Mw 8,000 | 0.75 | 0.075 |
| | | IRGACURE 2959 | 0.75 | 0.075 |

Comparative Example 1

An alignment film is formed on a COP substrate in the same manner as in Example 1 except that a composition solution is prepared with components of the alignment film as listed in the following Table 4, and a film laminate was then prepared in the same manner as used to form a liquid crystal film, including a COP substrate, an alignment film and a liquid crystal film, all of which are laminated in sequence. The composition as listed in the following Table 4 means a composition that has been widely used as a polyvinyl alcohol-based alignment film in the art.

TABLE 4

| | | | weight(g) | weight ratio(%) |
|---|---|---|---|---|
| Composition solution for an alignment film | Mixed solvent | Water | 568 | 56.8 |
| | | Ethanol | 412 | 41.2 |
| | Polyvinyl alcohol (87% hydrolysis), Mw 85,000~124,000 | | 20 | 2 |

Comparative Example 2

A film laminate was prepared by laminating a liquid crystal film on a COP substrate without forming an alignment film.

Determination of Phase Difference in Splay Alignment

A phase difference distribution was determined according to the viewing angles of the liquid crystal film formed on the alignment film prepared according to Example 2, as shown in FIG. 3. As seen from the graph of FIG. 3, it was revealed that the phase difference of the splay-aligned liquid crystal film is distributed uniformly according to the increasing viewing angles. Although not shown herein, it was confirmed that the graphs are plotted in the similar manner in the case of Examples 1 and 3.

Determination of Alignment Departure to Rubbing Angle

To compare with the optical compensation film prepared in Example 1, a WV (Wide View)-EA thin film (FUJI) as the TN-mode compensation film was evaluated together for optical-axis departure properties, and the results were shown in FIG. 4. In FIG. 4, a direction of lines present in rectangles of the optical compensation film means a degree of alignment of the liquid crystal to the rubbing angles. That is, the liquid crystal has a relatively lower optical-axis departure degree as the lines are aligned in the same direction. According to the present invention, it was revealed that the optical-axis departure angle to the rubbing angle was about 0.16° (degree) for Example 1, and the film used in the Comparative example has an optical-axis departure angle of about 0.31°.

Determination of Alignment Properties and Adhesiveness

The liquid crystal films prepared in Examples 1, 2 and 3, Comparative examples 1 and 2 were evaluated for alignment properties, adhesiveness between the substrate and the alignment film, and adhesiveness between the alignment film and the liquid crystal, and the results were listed in the following Table 5. The evaluation of the alignment properties was dividedly carried out: when there is no alignment at all (X); and when there is alignment with a slight deviation (O). The adhesiveness was determined by cross-cutting a surface of the liquid crystal film with a line style such as checkers at a distance of 1 mm according to the ASTM standard, and determining whether the liquid crystal film remains attached to the substrate when a cellophane tape is attached to the liquid crystal film and then detached from the liquid crystal film. Here, Level "O" represents that the liquid crystal film is intactly attached to the substrate, Level "x" represents that the liquid crystal film is partially or completely detached from the checkers of the substrate, and "-" represents that there is no result.

TABLE 5

| | | Alignment properties | Adhesiveness | |
|---|---|---|---|---|
| | | | Substrate/ alignment film | Alignment film/ liquid crystal film |
| Examples | 1 | ○ | ○ | ○ |
| | 2 | ○ | ○ | ○ |
| | 3 | ○ | ○ | ○ |
| Comparative examples | 1 | ○ | x | — |
| | 2 | x | — | — |

Preparation of Alignment Film Used for Planar Alignment

Example 4

A composition solution for an alignment film was prepared by dissolving a controlled content of the composition for an alignment film in a mixture solvent of water and alcohol at a temperature of 150° C., as listed in the following Table 6.

TABLE 6

| | | | weight(g) | weight ratio(%) |
|---|---|---|---|---|
| Composition solution of a for an alignment film | Mixed solvent | Water | 470 | 46.79 |
| | | Ehtanol | 491 | 48.88 |
| | Composition for an alignment film | Polyvinyl alcohol (87% hydrolysis), Mw 85,000~124,000 | 30 | 2.99 |
| | | pentaerythritol triacrylate | 9 | 0.90 |
| | | poly(4-vinylphenol) Mw 8,000 | 2.25 | 0.22 |
| | | IRGACURE 2959 | 2.25 | 0.22 |

A cycloolefin polymer (COP) was coated with the composition solution for an alignment film prepared according to the above method, using a wire bar, and the composition solution for an alignment film was dried with hot wind for 2 minutes in a 100° C. dry oven, and then cured once at a rate of 3 m/min using an 80 W/CM high-pressure mercury vapor lamp, and a surface of the cured alignment film was rubbed to prepare an alignment film.

A polymeric liquid crystal mixture with planar alignment was dissolved in toluene at a solid concentration of 25% by weight, the polymeric liquid crystal mixture being prepared by mixing 4-(6-acryloyoxyhexyloxy)-benzoic acid (4-cyanophenyl ester), 4-(6-acryloyoxyhexyloxy)-benzoic acid[4-trans-4-propylcyclohexyl]phenyl ester, 4-(3-acryloyoxypropyloxy)-benzoic acid 2-methyl-1,4-phenylene ester, 4-(6-acryloyoxyhexyloxy)-benzoic acid [4-trans-4-propylcyclohexyl]phenyl ester, and 4-(3-acryloyoxypropyloxy)-benzoic acid 2-methyl-1,4-phenylene ester. The alignment film was coated with the resultant liquid crystal solution using a wire bar, dried with hot wind for one minute in a 70° C. dry oven, and then cured once at a rate of 3 m/min, using an 80 W/CM high-pressure mercury vapor lamp, to prepare a liquid crystal film.

As a result, it is possible to finally prepare a film laminate including a COP substrate, a rubbed alignment film formed on the COP substrate, and a liquid crystal film formed on the alignment film, all of which are laminated in sequence.

Adhesive forces between layers, that is, between the COP and the alignment film, and between the alignment film and the liquid crystal film, were evaluated according to the cross-cut testing method as prescribed in the ASTM standard, and phase difference and optical-axis departure angles were measured according to the viewing angles using an AXOSCAN so as to evaluate optical properties of the liquid crystal film formed on the alignment film.

Example 5

An alignment film is formed on a COP substrate in the same manner as in Example 4 except that a composition solution is prepared with components of the alignment film as listed in the following Table 7, and a film laminate was then prepared in the same manner as used to form a liquid crystal film, including a COP substrate, an alignment film and a liquid crystal film, all of which are laminated in sequence.

TABLE 7

| | | | weight(g) | weight ratio(%) |
|---|---|---|---|---|
| Composition solution of a for an alignment film | Mixed solvent | Water | 470 | 46.82 |
| | | Ehtanol | 492.5 | 49.1 |
| | Composition for an alignment film | Polyvinyl alcohol (87% hydrolysis), Mw 85,000~124,000 | 30 | 2.99 |
| | | pentaerythritol tetraacrylate | 7.5 | 0.75 |
| | | poly(4-vinylphenol) Mw 8,000 | 1.875 | 0.19 |
| | | IRGACURE 2959 | 1.875 | 0.19 |

Example 6

An alignment film is formed on a COP substrate in the same manner as in Example 4 except that a composition solution is prepared with components of the alignment film as listed in the following Table 8, and a film laminate was then prepared in the same manner as used to form a liquid crystal film, including a COP substrate, an alignment film and a liquid crystal film, all of which are laminated in sequence.

TABLE 8

| | | | weight(g) | weight ratio(%) |
|---|---|---|---|---|
| Composition solution of a for an alignment film | Mixed solvent | Water | 470 | 46.82 |
| | | Ehtanol | 492.5 | 49.1 |
| | Composition for an alignment film | Polyvinyl alcohol (87% hydrolysis), Mw 85,000~124,000 | 30 | 2.99 |
| | | Dipentaerythritol hexaacrylate | 7.5 | 0.75 |
| | | poly(4-vinylphenol) Mw 8,000 | 1.875 | 0.19 |
| | | IRGACURE 2959 | 1.875 | 0.19 |

Comparative Example 3

An alignment film is formed on a COP substrate in the same manner as in Example 4 except that a composition solution is prepared with components of the alignment film as listed in the following Table 9, and a film laminate was then prepared in the same manner as used to form a liquid crystal film, including a COP substrate, an alignment film and a liquid crystal film, all of which are laminated in sequence. The composition as listed in the following Table 9 means a composition that has been widely used as a polyvinyl alcohol-based alignment film in the art.

TABLE 9

| | | | weight(g) | weight ratio(%) |
|---|---|---|---|---|
| Composition solution for an alignment film | Mixed solvent | Water | 568 | 56.8 |
| | | Ethanol | 412 | 41.2 |
| | Polyvinyl alcohol (87% hydrolysis) | | 20 | 2 |

Comparative Example 4

A film laminate was prepared by laminating a liquid crystal film on a COP substrate without forming an alignment film.

Determination of Phase Difference in Splay Alignment

A phase difference distribution was determined according to the viewing angles of the liquid crystal film formed on the alignment film prepared according to Example 5, as shown in FIG. 5. As seen from the graph of FIG. 5, it was revealed that the phase difference of the splay-aligned liquid crystal film is distributed uniformly on the basis of the viewing angle (0°) of the planar-aligned liquid crystal film, depending on the increasing viewing angles. Although not shown herein, it was confirmed that the graphs are plotted in the similar manner in the case of Examples 4 and 6.

Determination of Alignment Properties and Adhesiveness

The liquid crystal films prepared in Examples 4, 5 and 6, Comparative examples 3 and 4 were evaluated for alignment properties, adhesiveness between the substrate and the alignment film, and adhesiveness between the alignment film and the liquid crystal, and the results were listed in the following Table 10.

TABLE 10

| | | Alignment properties | Adhesiveness | |
|---|---|---|---|---|
| | | | Substrate/ alignment film | Alignment film/ liquid crystal film |
| Examples | 1 | ○ | ○ | ○ |
| | 2 | ○ | ○ | ○ |
| | 3 | ○ | ○ | ○ |
| Comparative examples | 1 | ○ | x | — |
| | 2 | x | — | — |

As described above, it was revealed that, when the composition for an alignment film according to the present invention is used to form an alignment film and a liquid crystal film is formed on the alignment film, the alignment film has excellent optical properties and adhesive properties.

According to the present invention, the additional separation and purification processes are not required, and it is possible to prepare the composition for an alignment film having excellent adhesiveness to the liquid crystal layer formed on the alignment film, and the alignment film has good adhesiveness even when it is formed on certain substrates rather than triacetyl cellulose such as a cycloolefin polymer, and the liquid crystal film formed on the alignment film has a minimized optical-axis departure angle.

While the present invention has been shown and described in connection with the exemplary embodiments, it will be apparent to those skilled in the art that modifications and variations can be made without departing from the spirit and scope of the invention as defined by the appended claims.

The invention claimed is:

1. A composition for an alignment film that is used for splay alignment, comprising:

polyvinyl alcohol (PVA);
13 to 25% by weight of an acrylate monomer based on the weight of the polyvinyl alcohol;
20 to 30% by weight of a compatibilizing agent, which is poly(4-vinylphenol), based on the weight of the acrylate monomer; and
10 to 50% by weight of an aqueous photo initiator based on the weight of the acrylate monomer.

2. The composition for an alignment film of claim 1, wherein the polyvinyl alcohol is hydrolyzed by 96% or less.

3. The composition for an alignment film of claim 1, wherein one or two or more multifunctional acrylate monomers having 3 to 6 carbon atoms are used as the acrylate monomer.

4. The composition for an alignment film of claim 3, wherein the acrylate monomer is selected from the group consisting of pentaerythritol triacrylate (PETA), pentaerythritol tetraacrylate (PETTA) and dipentaerythritol hexaacrylate (DPHA).

5. The composition for an alignment film of claim 4, wherein the acrylate monomer is present at a content of 17 to 25% by weight based on the weight of the polyvinyl alcohol when the acrylate monomer is pentaerythritol triacrylate.

6. The composition for an alignment film of claim 4, wherein the acrylate monomer is present at a content of 15 to 21% by weight based on the weight of the polyvinyl alcohol when the acrylate monomer is pentaerythritol tetraacrylate.

7. The composition for an alignment film of claim 4, wherein the acrylate monomer is present at a content of 13 to 21% by weight based on the weight of the polyvinyl alcohol when the acrylate monomer is dipentaerythritol hexaacrylate.

8. The composition for an alignment film of claim 1, wherein the compatibilizing agent is solube in water.

9. The composition for an alignment film of claim 1, wherein the photo initiator is soluble in water.

10. The composition for an alignment film of claim 9, wherein the photo initiator is selected from the group consisting of 2-hydroxy-1[4-(2-hydroxyethoxy)phenyl]-2-methyl-1-propanone (IRGACURE 2959), a mixture of 1-hydroxycyclohexyl-phenyl-ketone and benzophenone (IRGACURE 500) and a mixture of oxy-phenyl-acetic acid 2[2-oxo-2-phenyl-acetoxy-ethoxyl-ethyl ester and oxyphenyl-acetic 2-[2-hydroxy-ethoxyl]-ethyl ester (IRGACURE 754).

11. The composition for an alignment film of claim 1, wherein the composition for an alignment film is dissolved in a mixture solvent of water and alcohol to form a composition solution for an alignment film.

12. The composition for an alignment film of claim 11, wherein the composition for an alignment film is present at a content of 2.44 to 7.25% by weight in the composition solution.

13. The composition for an alignment film of claim 11, wherein a ratio of water: alcohol in the mixture solvent ranges from 40:60 to 50:50.

14. The composition for an alignment film of claim 11, wherein the alcohol is selected from the group consisting of methylalcohol, ethylalcohol and isopropylalcohol.

15. A composition for an alignment film that is used for planar alignment, comprising:
polyvinyl alcohol (PVA);
more than 25% by weight of an acrylate monomer based on the weight of the polyvinyl alcohol;
20 to 30% by weight of an aqueous compatibilizing agent, which is poly(4-vinylphenol), based on the weight of the acrylate monomer; and
10 to 50% by weight of an aqueous photo initiator based on the weight of the acrylate monomer.

16. The composition for an alignment film of claim 15, wherein the polyvinyl alcohol is hydrolyzed by 96% or less.

17. The composition for an alignment film of claim 15, wherein one or two or more multifunctional acrylate monomers having 3 to 6 carbon atoms are used as the acrylate monomer.

18. The composition for an alignment film of claim 17, wherein the acrylate monomer is selected from the group consisting of pentaerythritol triacrylate (PETA), pentaerythritol tetraacrylate (PETTA) and dipentaerythritol hexaacrylate (DPHA).

19. The composition for an alignment film of claim 18, wherein the acrylate monomer is present at a content of more than 30% by weight based on the weight of the polyvinyl alcohol when the acrylate monomer is pentaerythritol triacrylate.

20. The composition for an alignment film of claim 18, wherein the acrylate monomer is present at a content of more than 25% by weight based on the weight of the polyvinyl alcohol when the acrylate monomer is pentaerythritol tetraacrylate.

21. The composition for an alignment film of claim 18, wherein the acrylate monomer is present at a content of more than 25% by weight based on the weight of the polyvinyl alcohol when the acrylate monomer is dipentaerythritol hexaacrylate.

22. The composition for an alignment film of claim 15, wherein the compatibilizing agent is soluble in water.

23. The composition for an alignment film of claim 15, wherein the photo initiator is soluble in water.

24. The composition for an alignment film of claim 23, wherein the photo initiator is selected from the group consisting of 2-hydroxy-1[4-(2-hydroxyethoxy)phenyl]-2-methyl-1-propanone (IRGACURE 2959), a mixture of 1-hydroxycyclohexyl-phenyl-ketone and benzophenone (IRGACURE 500) and a mixture of oxy-phenyl-acetic acid 2[2-oxo-2-phenyl-acetoxy-ethoxyl-ethyl ester and oxyphenyl-acetic 2-[2-hydroxy-ethoxy1]-ethyl ester (IRGACURE 754).

25. The composition for an alignment film of claim 15, wherein the composition for an alignment film is dissolved in a mixture solvent of water and alcohol to form a composition solution for an alignment film.

26. The composition for an alignment film of claim 25, wherein the composition for an alignment film is present at a content of 3.78 to 8.15% by weight in the composition solution.

27. The composition for an alignment film of claim 25, wherein a ratio of water: alcohol in the mixture solvent ranges from 40:60 to 50:50.

28. The composition for an alignment film of claim 25, wherein the alcohol is selected from the group consisting of methylalcohol, ethylalcohol and isopropylalcohol.

* * * * *